(12) United States Patent
Schuba et al.

(10) Patent No.: US 8,225,086 B2
(45) Date of Patent: Jul. 17, 2012

(54) METHOD AND APPARATUS FOR REMOTELY AUTHENTICATING A COMMAND

(75) Inventors: Christoph L. Schuba, Mountain View, CA (US); James P. Hughes, Palo Alto, CA (US)

(73) Assignee: Oracle America, Inc., Redwood Shores, CA (US)

( * ) Notice: Subject to any disclaimer, the term of this patent is extended or adjusted under 35 U.S.C. 154(b) by 832 days.

(21) Appl. No.: 11/939,412

(22) Filed: Nov. 13, 2007

(65) Prior Publication Data

US 2009/0125715 A1 May 14, 2009

(51) Int. Cl.
*H04L 29/06* (2006.01)
(52) U.S. Cl. ........................................ 713/155
(58) Field of Classification Search .................... 713/155
See application file for complete search history.

(56) References Cited

U.S. PATENT DOCUMENTS

| | | | | |
|---|---|---|---|---|
| 5,535,276 A * | 7/1996 | Ganesan | | 713/155 |
| 5,737,419 A * | 4/1998 | Ganesan | | 713/169 |
| 6,799,270 B1 * | 9/2004 | Bull et al. | | 713/153 |
| 7,363,500 B2 * | 4/2008 | Funk | | 713/180 |
| 2002/0035685 A1 * | 3/2002 | Ono et al. | | 713/155 |
| 2004/0187024 A1 * | 9/2004 | Briscoe et al. | | 713/201 |
| 2004/0210756 A1 * | 10/2004 | Mowers et al. | | 713/168 |
| 2005/0125663 A1 * | 6/2005 | Funk | | 713/168 |

* cited by examiner

*Primary Examiner* — Kambiz Zand
*Assistant Examiner* — Teshome Hailu
(74) *Attorney, Agent, or Firm* — Park, Vaughan, Fleming & Dowler LLP

(57) ABSTRACT

A system that remotely authenticates a command is presented. During operation, an authentication system receives the command from an intermediary system, wherein the command is to be executed on a target system. Next, the authentication system authenticates the intermediary system. If the intermediary system is successfully authenticated, the authentication system authenticates the command using a private key for the authentication system to produce an authenticated command. Next, the authentication system sends the authenticated command to the intermediary system, thereby enabling the intermediary system to send the authenticated command to the target system so that the target system can use a public key for the authentication system to verify and execute the command.

23 Claims, 5 Drawing Sheets

METHOD AND APPARATUS FOR REMOTELY AUTHENTICATING A COMMAND

BACKGROUND

1. Field of the Invention

The present invention relates to techniques for remotely authenticating a command. More specifically, the present invention relates to a method and apparatus for remotely authenticating a command to be executed on a target computer system.

2. Related Art

As the number of computer systems used by an organization increases, it becomes progressively harder to perform system maintenance operations for these computer systems. One of the tasks involved in maintaining a computer system is to issue commands from a remote system to be executed by the computer system. For example, these commands can include commands to install new software, commands to install software patches, commands to upgrade firmware, commands to install trust anchors (e.g., public keys for trusted systems), and commands to request configuration information.

To issue a command to a computer system, a system administrator typically uses a computer system belonging to the administrator to send a command to one or more target computer systems. During this process, it is desirable to require minimal interaction with a system administrator and minimal preconfiguration of the target computer systems. However, at the same time there is a need to prevent unauthorized users from issuing unauthorized commands.

Hence, what is needed is a method and an apparatus for remotely authenticating a command without the problems described above.

SUMMARY

Some embodiments of the present invention provide a system that remotely authenticates a command. During operation, an authentication system receives the command from an intermediary system, wherein the command is to be executed on a target system. Next, the authentication system authenticates the intermediary system. If the intermediary system is successfully authenticated, the authentication system authenticates the command using a private key for the authentication system to produce an authenticated command. Next, the authentication system sends the authenticated command to the intermediary system. This enables the intermediary system to send the authenticated command to the target system so that the target system can use a public key for the authentication system to verify and execute the command.

In some embodiments, prior to receiving the command at the authentication system, the intermediary system generates the command to be executed on the target system.

In some embodiments, prior to receiving the command to at the authentication system, the intermediary system generates the command to be executed on the target system. The intermediary system then authenticates the command using the public key for the authentication system to produce a second authenticated command. While receiving the command, the authentication system receives the second authenticated command. Prior to authenticating the command using the private key for the authentication system, the authentication system verifies the second authenticated command using the private key for the authentication system to produce the command.

In some embodiments, while authenticating the command, the authentication system uses the private key to encrypt the command. By doing so, the target system can verify the authenticated command by using the public key to decrypt the authenticated command.

In some embodiments, while authenticating the command, the authentication system uses the private key to generate an authentication code for the command. While sending the authenticated command to the intermediary system, the authentication system sends the command and the authentication code to the intermediary system. By doing so, the target system can verify the authenticated command by using the public key to verify that the authentication code was generated by the authentication system.

In some embodiments, the intermediary system verifies that the authenticated command was received from the authentication system in response to a request by the intermediary system.

In some embodiments, the target system verifies that the authenticated command was received from an intermediary system known to the target system.

In some embodiments, the target system, the authentication system, and the intermediary system use challenge messages and challenge responses during communications with each other to prevent replay attacks.

In some embodiments, the challenge messages and/or challenge responses include: nonces and/or hash values which include the nonces.

DETAILED DESCRIPTION

Figure 1:
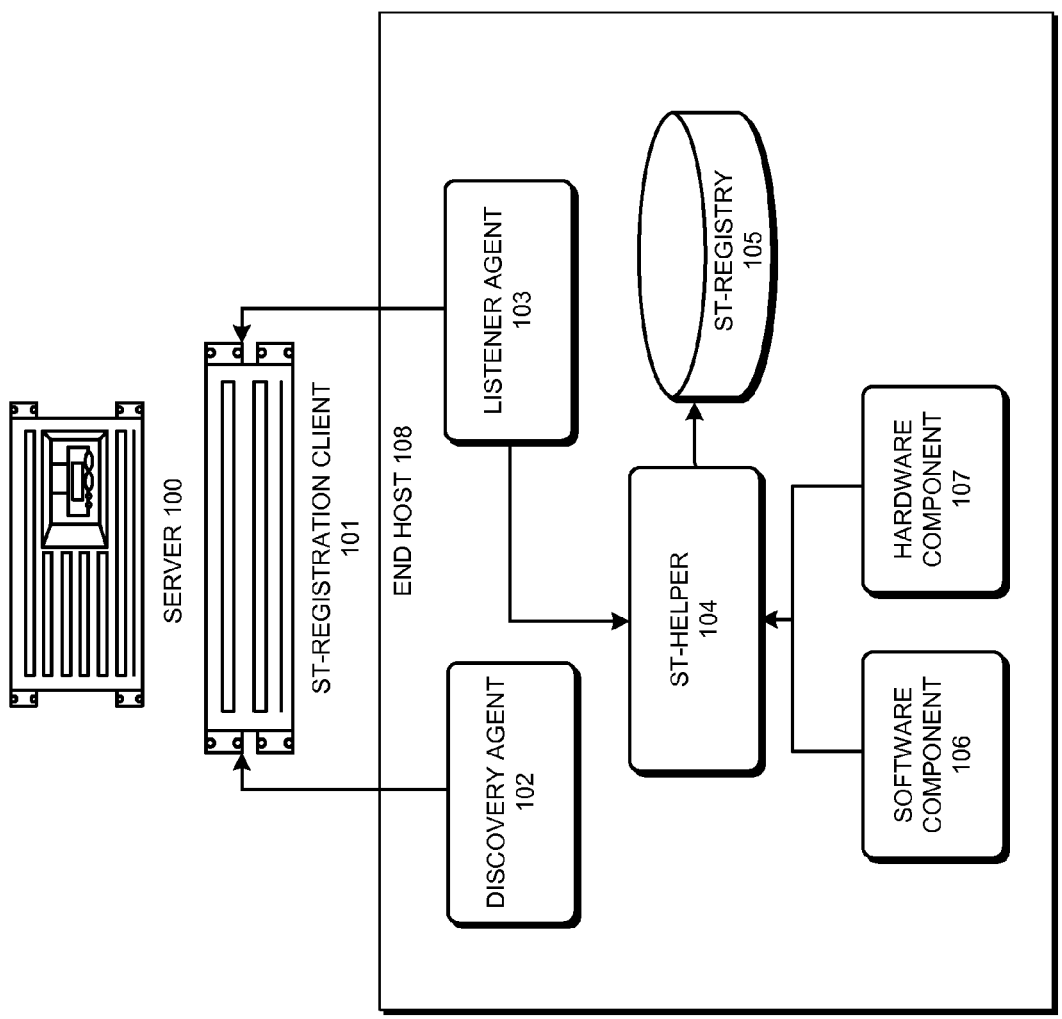
FIG. 1 presents a block diagram illustrating a server, a service tag registration client (ST-registration client), and an end host in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

It is often desirable to be able to securely issue commands from an intermediary system, such as a service tag registration (ST-registration) client to a target system (e.g., an end host), wherein the command is to be executed at the target system without requiring every target system to be individually preconfigured with a trust anchor (e.g., a public key of the ST-registration client). This process is commonly referred to as a "no-touch" process. For example, an ST-registration client can use this command facility to install its own public key onto a number of end hosts.

Note that securely issuing commands means assuring the authenticity and integrity of commands before the commands are executed by an end host. In other words, only properly authenticated systems can issue commands. Hence, some embodiments of the present invention ensure that commands to be executed are the commands that were intended to be executed.

In some embodiments, an ST-registration client C issues authenticated commands to one or more end hosts $H_i$ that are within the ST-registration client's policy domain.

In some embodiments, an authentication server S signs command requests for an ST-registration client. In some embodiments, the authentication server first authenticates an ST-registration client before signing a command issued by the ST-registration client. The signed command is then returned to the ST-registration client, which then forwards the command to an end host. The end host then verifies that the signed command is authentic and executes the command.

In some embodiments, an ST-registration client has access to a public key of an authentication server ($k^+s$). In some embodiments, an end host has access to a public key of an authentication server ($k^+s$). In these embodiments, a command encrypted with the public key of the server is considered to be properly signed and authentic (i.e., the command is considered a trusted command).

Computer System

FIG. 1 presents a block diagram illustrating a server 100, an ST-registration client 101, and an end host 108 in accordance with an embodiment of the present invention. In some embodiments end host 108 includes discovery agent 102, listener agent 103, service tag helper (ST-helper) 104, service tag registry (ST-registry) 105, software component 106, and hardware component 107. In some embodiments, server 100 is an authentication system which authenticates commands to be executed on a target system (e.g., end host 108).

Server 100 can generally include any computational node including a mechanism for servicing requests from a client for computational and/or data storage resources. Server 100, ST-registration client 101 and end host 108 can be located at the same physical location (e.g., within the same building) or can be located at different physical locations. Similarly, server 100, ST-registration client 101 and end host 108 can be located on same network (e.g., the same corporate network) or can be located on different networks. Note that a network can generally include any type of wired or wireless communication channel capable of coupling together computing nodes. This includes, but is not limited to, a local area network, a wide area network, or a combination of networks. In some embodiments of the present invention, the networks can include the Internet. Furthermore, in some embodiments, server 100 can include one or more computer systems.

In some embodiments, discovery agent 102 listens for requests from ST-registration client 101 to send service tags for end host 108 to ST-registration client 101. Discovery agent 102 then responds by informing ST-registration client 101 which port to use and which protocol to use (e.g., TCP, UDP, etc.) on end host 108 to retrieve service tag information. In some embodiments, when ST-registration client 101 contacts the appropriate port on end host 108, listener agent 103 receives the request and communicates with ST-helper 104.

In some embodiments, ST-helper 104 interacts with ST-registry 105, software component 106, and hardware component 107. ST-registry 105 can store one or more service tags for one or more software components and/or one or more hardware components. Note that a service tag includes configuration information for a given software or hardware component. Also note that any number of hardware and/or software components can be included in end host 108.

In some embodiments, a service tag can include a version number of one or more software packages installed on the first system; a version number of one or more hardware components installed on the first system; serial numbers for hardware components; serial numbers for software components; an operating system version number; firmware version numbers for hardware components; runtime instances of software components; and any other configuration information for an end host.

In some embodiments, ST-registry 105 is a database, which can include any type of system for storing data in non-volatile storage. This includes, but is not limited to, systems based upon magnetic, optical, and magneto-optical storage devices, as well as storage devices based on flash memory and/or battery-backed up memory.

Figure 2:
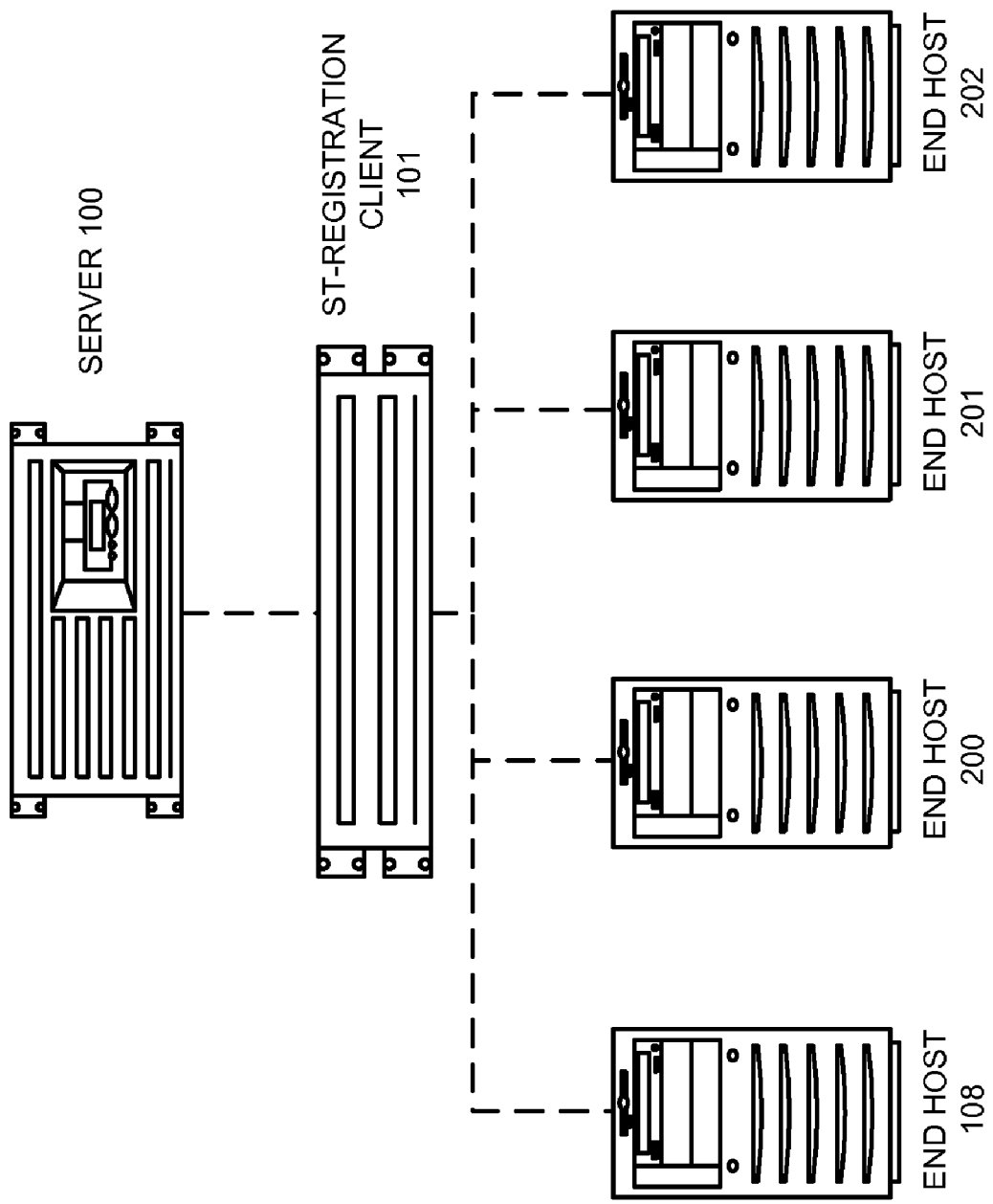
FIG. 2 presents a block diagram illustrating a server, an ST-registration client, and a number of end hosts in accordance with an embodiment of the present invention.

In some embodiments, ST-registration client 101 manages one or more end hosts. These embodiments are illustrated in FIG. 2, which includes server 100, ST-registration client 101, and end hosts 108 and 200-202. Note that end hosts 200-202 can include components similar to end host 108.

In some embodiments, server 100 provides authentication services for one or more ST-registration clients.

Remotely Authenticating a Command

Figure 3:
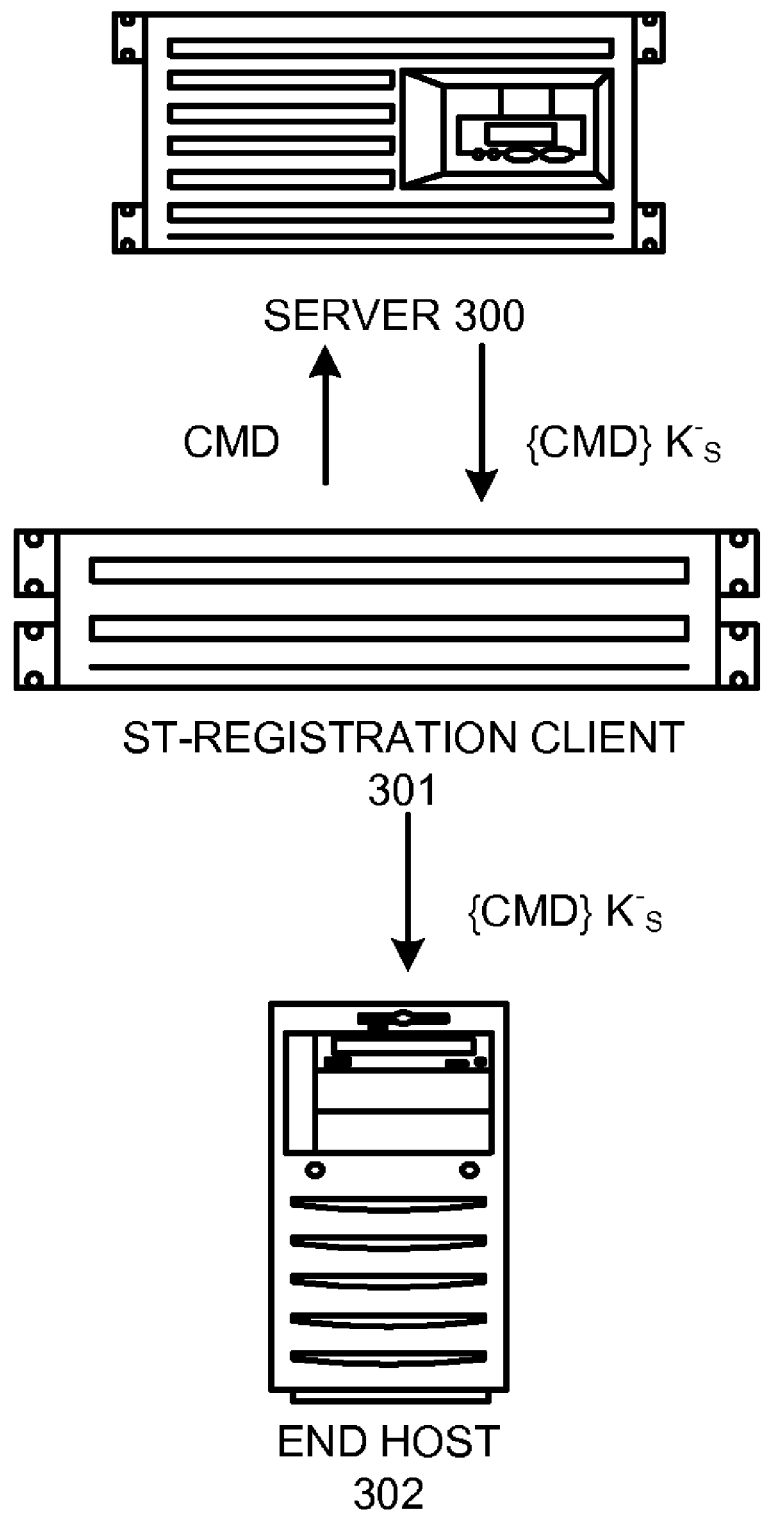
FIG. 3 presents a block diagram illustrating an ST-registration client sending a command to an end host in accordance with an embodiment of the present invention.

FIG. 3 presents a block diagram illustrating a process for authenticating a command in accordance with an embodiment of the present invention. In FIG. 3, ST-registration client 301 sends a command CMD to server 300. In some embodiments, server 300 then authenticates ST-registration client 301. Next, server 300 uses a private key for server 300 ($K^-_s$) to authenticate CMD (i.e., $\{CMD\}\ K^-_s$). In some embodiments, while authenticating the command, server 300 generates an authentication code (e.g., a digital signature) for the command. In other embodiments, while authenticating the command, server 300 encrypts the command.

Figure 4:
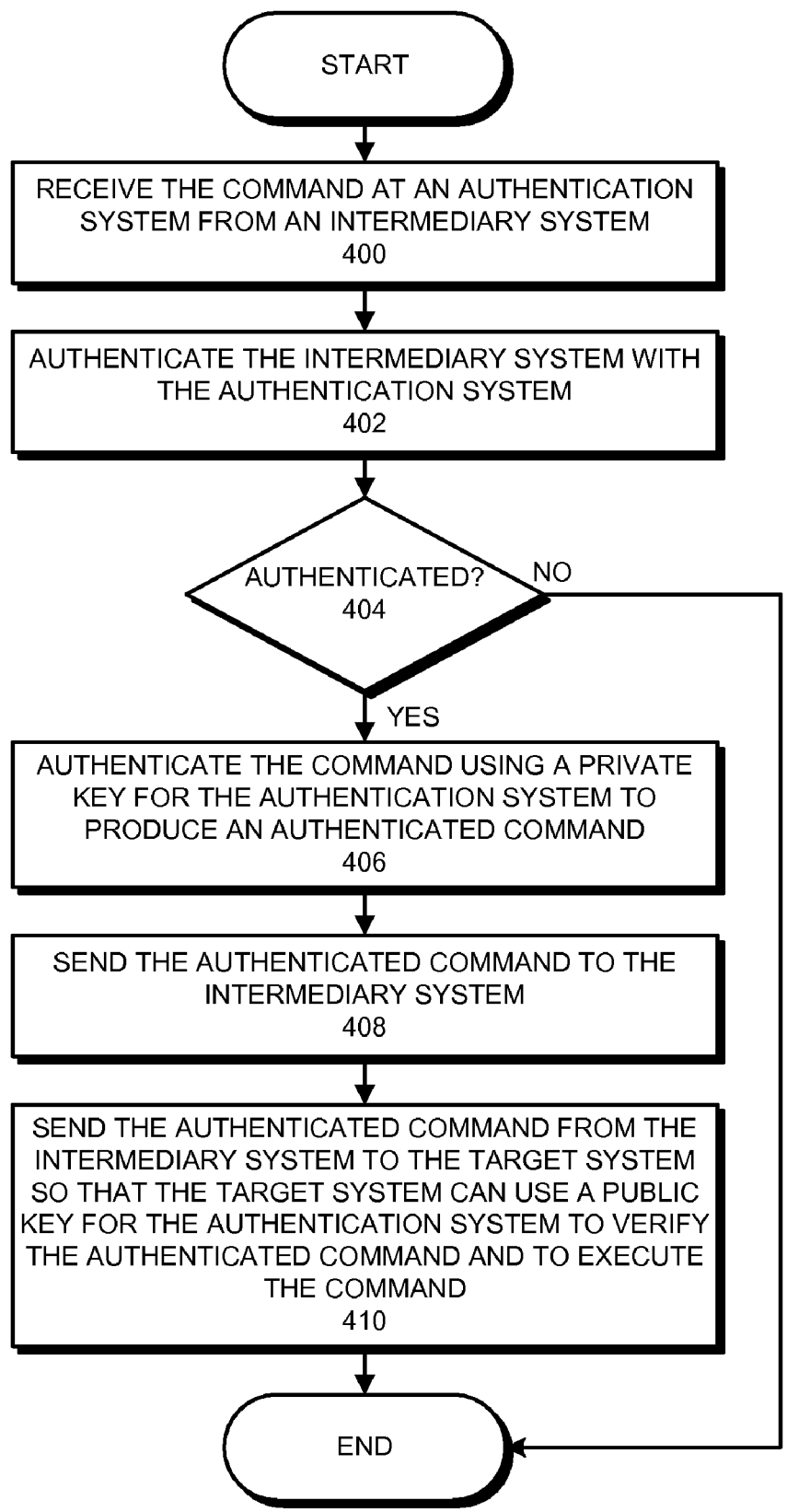
FIG. 4 presents a flow chart illustrating a process for authenticating a command at an authentication system in accordance with an embodiment of the present invention.
Figure 5:
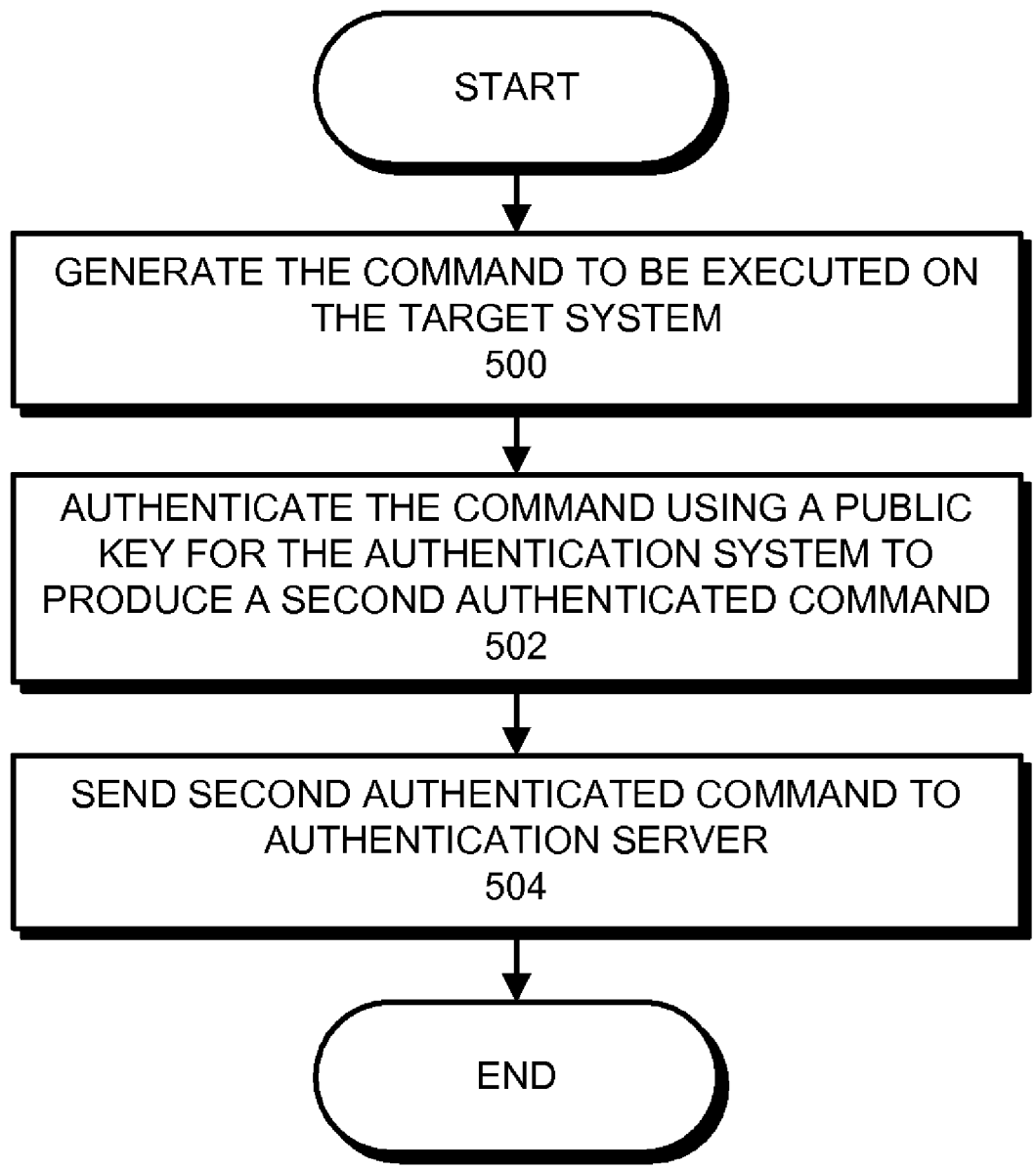
FIG. 5 presents a flow chart illustrating a process for generating and encrypting a command at an intermediary system in accordance with an embodiment of the present invention.

Server 300 then sends $\{CMD\}\ K^-_s$ to ST-registration client 301. If server 300 generated an authentication code for the command, server 300 sends the command and the authentication code. If server 300 encrypted the command, server 300 sends the encrypted command. Next, ST-registration client 301 sends $\{CMD\}\ K^-_s$ to end host 302. End host 302 then uses a public key for server 300 (i.e., $K^+_s$) to verify $\{CMD\}\ K^-_s$. If server 300 generated an authentication code for the command, while verifying the authenticated command, end host 302 uses the public key for server 300 to verify that the authentication code was generated by server 300. If server 300 encrypted the command, while verifying the authenticated command, end host 302 uses the public key for server 300 to decrypt the encrypted command to recover CMD. Next, end host 302 executes CMD. FIGS. 4-5 describe this command-authentication process in more detail. Note that in FIGS. 4-5, the authentication system corresponds to servers 100 and 300, the intermediary system corresponds to ST-registration clients 101 and 301, the target system corresponds to end hosts 108, 200-202, and 302 in FIGS. 1-3.

FIG. 4 presents a flow chart illustrating a process for authenticating a command at an authentication system in accordance with an embodiment of the present invention. The process begins when the authentication system receives the command from an intermediary system (step 400), wherein the command is to be executed on a target system. Next, the authentication system authenticates the intermediary system (step 402). If the intermediary system is successfully authenticated (step 404, yes), the authentication system authenticates the command using a private key for the authentication system to produce an authenticated command (step 406). In some embodiments, while authenticating the command, the authentication system uses its private key to encrypt the command. In some embodiments, while authenticating the command, the authentication system uses its private key to generate an authentication code for the command.

Next, the authentication system sends the authenticated command to the intermediary system (step 408). In some embodiments, if the authentication system generated an authentication code, the authentication system sends the command and the authentication code to the intermediary system. The intermediary system then sends the authenticated command to the target system, which enables the target system to use a public key for the authentication system to verify and execute the command (step 410). In some embodiments, if the authentication system generated an authentication code, the intermediary system sends the command and the authentication code to the target system. In some embodiments, if the authentication system encrypted the command, the target system verifies the authenticated command by using the public key for the authentication system to decrypt the authenticated command. In some embodiments, if the authentication system generated an authentication code, the target system verifies the authenticated command by using the public key for the authentication system to verify that the authentication code was generated by the authentication system.

At step 404, if the intermediary system is not successfully authenticated (step 404, no), the authentication system aborts the transaction.

FIG. 5 presents a flow chart illustrating a process for generating and encrypting a command at an intermediary system in accordance with an embodiment of the present invention. Prior to step 400 in FIG. 4 the intermediary system generates the command to be executed on the target system (step 500). The intermediary system then authenticates the command using a public key for the authentication system to produce a second authenticated command (step 502). In some embodiments, while authenticating the command, the intermediary system uses the public key for the authentication system to encrypt the command. In some embodiments, while authenticating the command, the intermediary system uses the public key for the authentication system to generate an authentication code for the command.

Next, the intermediary system sends the second authenticated command to the authentication server (step 504). In some embodiments, if the intermediary system generated an authentication code, the intermediary system sends the command and the authentication code to the authentication system. The authentication server then uses a private key for the authentication server to verify the second authenticated command. In some embodiments, if the intermediary system encrypted the command, while verifying the second authenticated command, the authentication system uses its private key to decrypt the second authenticated command. In some embodiments, if the intermediary system generated an authentication code for the command, while verifying the second authenticated command, the authentication system uses its private key to verify that the authentication code was generated by the intermediary system, and therefore, verifying that the command was generated by the intermediary system.

EXEMPLARY IMPLEMENTATION

The following conventions are used in the exemplary implementation below.

k: a key which can be a symmetric key or a public/private key $k_A$: a private key belonging only to principal A $k_{AB}$: a shared key between principals A and B $k^+_A$: public part of a public/private key belonging to principal A $k^-_A$: private part of a public/private key belonging to principal A $\{m\}k$: message m encrypted with key k $m_{(i)}$: $i^{th}$ message that's part of the protocol exchange H ( ): some cryptographically strong hash function (e.g., SHA1)

$h_x$: hash value, further identified with index X

': concatenation

Protocol and System Assumptions

In the exemplary implementation below, the following assertions are assumed:

(1) the public key $k^+_S$ is universally known;

(2) the private key $k^-_S$ is exclusively known to S;

(3) the principals C (the ST-Registration Client) and H (end host) have a private secrets $k_C$ and $k_B$, respectively, which can be changed periodically;

(4) S has a way of strongly authenticating C; and (5) the notation $ID_H$ can identify either a single H or a number of end hosts $H_i$.

Command Signing Phase of the Protocol

In some embodiments, the command-signing phase is executed once for each new command-host ID ($ID_H$) combination.

In some embodiments, C creates $nonce_{Cs}$. Note that a nonce is a number used only once. Next, C generates a hash $h_{Cs}$=H (cmd, $ID_H$, $ID_C$, $nonce_{Cs}$, $k_C$), where cmd is a command to be executed on an end host, $ID_H$ is an identifier associated with end host H, $ID_C$ is an identifier associated with a registration client C, and $k_C$ is a private key for registration client C. C then attempts to authenticate itself with S.

In some embodiments, registration client C sends a message to an authentication server S, wherein the message includes a command to be executed on a host system. In some embodiments, C sends a message
$m_{(1)}$=({cmd, $ID_H$, $ID_C$, $nonce_{Cs}$, $h_{Cs}$}$k^+_s$) to S.

In some embodiments, S aborts the transaction with C if C is not authenticated with S. In other embodiments, if C is authenticated with S, S decrypts message $m_{(1)}$ using $k^-_s$.

In some embodiments, S aborts the transaction with C if the contents of decrypted message $m_{(1)}$ are not valid. For example, S aborts the transaction with C if the content of the decrypted message is nonsense.

In some embodiments, S aborts the transaction with C if the received $ID_C$ and the authenticated identity of C (i.e., the identity of C as determined by the authentication process above) do not match.

In some embodiments, S aborts the transaction with C if $ID_H$ is not under C's authority. These embodiments prevent C from creating signed commands for other domains.

In some embodiments, S sends a message $m_{(2)}$ to C. In some embodiments, $m_{(2)}=(\{cmd, ID_H, ID_C, nonce_{Cs}, h_{Cs}\}k^-_s)$.

In some embodiments, after receiving $m_{(2)}$, C decrypts message $m_{(2)}$ using $k^+_s$. In some embodiments, C aborts the transaction if decryption of message $m_{(2)}$ using $k^+_s$ does not produce valid data (e.g., the data does not make sense). C then calculates $h'_{Cs}=H(cmd, ID_H, ID_C, nonce_{Cs}, k_C)$.

In some embodiments, C aborts the transaction if received value $h_{Cs} \neq h'_{Cs}$. In some embodiments, C aborts the transaction if received value $nonce_{Cs}$ is not fresh.

Command Issuing Phase

In some embodiments, the command-issuing phase is executed one or more times for a given $ID_H$.

In some embodiments, C creates $nonce_{CH}$. C then calculates $$h_{CH}=H(m_{(2)}, ID_H, ID_C, nonce_{CH}, k_C).$$

In some embodiments, C sends $m_{(3)}$ to H. In some embodiments, $m_{(3)}=(m_{(2)}, ID_H, ID_C, nonce_{CH}, h_{CH})$. H then determines $ID'_C$ (i.e., the determined identity of C) to be the sender of message $m_{(3)}$. In some embodiments, H aborts the transaction if $ID'_C \neq ID_C$ (the determined identity of C is not the same as the identity of C included in $m_{(3)}$). In some embodiments, H aborts the transaction if the identity of H is not part of $ID_H$.

In some embodiments, H then creates $nonce_{HC}$. H then calculates $$h_{HC}=H(m_{(2)}, ID_H, ID_C, nonce_{HC}, k_H).$$

In some embodiments, H sends $m_{(4)}$ to C. In some embodiments, $m_{(4)}=(m_{(2)}, ID_H, ID_C, nonce_{HC}, nonce_{CH}, h_{HC}, h_{CH})$. C then calculates $h'_{CH}=H(m_{(2)}, ID_H, ID_C, nonce_{CH}, k_C)$.

In some embodiments, C aborts the transaction if $h_{CH} \neq h'_{CH}$. In some embodiments, C aborts if received value $nonce_{CH}$ is not fresh.

In some embodiments, C sends $m_{(5)}$ to H. In some embodiments, $m_{(5)}=(m_{(2)}, ID_H, ID_C, nonce_{HC}, h_{HC})$. H then determines $ID'_C$ to be the sender of $m_{(5)}$. In some embodiments, H aborts the transaction if $ID'_C \neq ID_C$.

In some embodiments, H calculates $h_{HC}=H(m_{(2)}, ID_H, ID_C, nonce_{HC}, k_H)$. In some embodiments, H aborts the transaction if $h_{HC} \neq h'_{HC}$. In some embodiments, H aborts if received value $nonce_{HC}$ is not fresh.

In some embodiments, H decrypts message $m_{(2)}$ using $k^+_s$, thereby asserting its origin to be S. In some embodiments, H aborts the transaction if the decrypted message $m_{(2)}$ is not valid (e.g., the message is garbled). In some embodiments, H aborts if received value $ID_H$ included in $m_{(2)}$ does not include its own identity (i.e., H's identity). In some embodiments, H aborts if $ID'_C$ does not equal the received value $ID_C$ inside $m_{(2)}$.

In some embodiments, H executes received command cmd included in the decrypted message $m_{(2)}$.

Discussion

In some embodiments, the command-signing phase is executed once for each command-target host combination. In some embodiments, the command-issuing phase is executed for each command invocation per target host.

The above-described exemplary protocol minimizes the interaction with S, making the architecture scalable. The exemplary protocol protects against replay attacks by using nonces for challenge response. In some embodiments, if a message is modified by an eavesdropper, it can be detected before H executes the command cmd.

The above-described exemplary protocol is stateless at all nodes with the exception of the required nonces that protect against replay attacks. However, if a local clock value is used as the nonce (no globally synchronized clock is necessary), this exemplary protocol is completely stateless. The exemplary protocol, therefore, can protect participating systems against a memory resource denial of service attack (e.g., SYN flooding).

In some embodiments, state (timers) can be used at C and H to protect against denial of service attacks against message availability (e.g., where protocol messages are removed from the communication channel).

In some embodiments, H and/or C perform a minimum amount of processing to determine if a message should be acted upon, or if the transaction should be aborted. These embodiments reduce the chance of a denial of service attack against computational resources.

Note that the notation $ID_H$ does not imply that only a single entity is addressed. $ID_H$ can denote a set of leaf nodes $H_i$, all of which belong to the authority domain of C.

In some embodiments, a message which is encrypted with the private key from S is considered properly signed.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for remotely authenticating a command, comprising:
   receiving a message at an authentication system from an intermediary system, wherein the message comprises: a command that is to be executed on a target system in a plurality of target systems, an identifier for the target system, and an identifier for the intermediary system;
   authenticating the intermediary system;
   if the intermediary system is successfully authenticated, authenticating the message using a private key for the authentication system to produce an authenticated message, wherein the authenticated message comprises the command, the identifier for the target system, and the identifier for the intermediary system; and
   sending the authenticated message to the intermediary system, thereby enabling the intermediary system to send the authenticated message to the target system so that the target system can use a public key for the authentication system to verify the authenticated message and to execute the command, wherein the public key is known to each target system in the plurality of target systems,
   wherein the target system verifies that the authenticated message was sent by an intermediary system known to the target system by determining whether the identifier for the intermediary system from the authenticated message is the same as an identity of the intermediary system that is determined by the target system.

2. The method of claim 1, wherein prior to receiving the message at the authentication system, the intermediary system generates the command to be executed on the target system.

3. The method of claim 1,
   wherein prior to receiving the message at the authentication system, the intermediary system:

generates the command to be executed on the target system; and authenticates the message using the public key for the authentication system to produce a second authenticated message;

wherein while receiving the message, the authentication system receives the second authenticated message; and wherein prior to authenticating the message the authentication system verifies the second authenticated message using the private key for the authentication system to produce the message.

4. The method of claim 1,
wherein authenticating the message involves using the private key to encrypt the message; and
wherein the target system verifies the authenticated message by using the public key to decrypt the authenticated message.

5. The method of claim 1,
wherein authenticating the message involves using the private key to generate an authentication code for the message;
wherein sending the authenticated message to the intermediary system involves sending the message and the authentication code to the intermediary system; and
wherein the target system verifies the authenticated message by using the public key to verify that the authentication code was generated by the authentication system.

6. The method of claim 1, wherein the intermediary system verifies that the authenticated message was received from the authentication system in response to a request by the intermediary system.

7. The method of claim 1, wherein the method further comprises using challenge messages and challenge responses during communications between the target system, the authentication system, and the intermediary system, wherein the challenge messages and responses can be used to detect replay attacks.

8. The method of claim 7, wherein the challenge messages and/or challenge responses include one or more of:
nonces; and
hash values which include the nonces.

9. A non-transitory computer-readable storage medium storing instructions that when executed by a computer cause the computer to perform a method for remotely authenticating a command, wherein the method comprises:
receiving a message at an authentication system from an intermediary system, wherein the message comprises: a command that is to be executed on a target system in a plurality of target systems, an identifier for the target system, and an identifier for the intermediary system;
authenticating the intermediary system;
if the intermediary system is authenticated, authenticating the message using a private key for the authentication system to produce an authenticated message, wherein the authenticated message comprises the command, the identifier for the target system, and the identifier for the intermediary system; and
sending the authenticated message to the intermediary system thereby enabling the intermediary system to send the authenticated command to the target system so that the target system can use a public key for the authentication system to verify the authenticated command and to execute the command, wherein the public key is known to each target system in the plurality of target systems,
wherein the target system verifies that the authenticated message was sent by an intermediary system known to the target system by determining whether the identifier for the intermediary system from the authenticated message is the same as an identity of the intermediary system that is determined by the target system.

10. The non-transitory computer-readable storage medium of claim 9, wherein prior to receiving the message at the authentication system, the intermediary system generates the command to be executed on the target system.

11. The non-transitory computer-readable storage medium of claim 9,
wherein prior to receiving the message at the authentication system, the intermediary system:
generates the command to be executed on the target system; and
authenticates the message using the public key for the authentication system to produce a second authenticated message;
wherein while receiving the message, the authentication system receives the second authenticated message; and
wherein prior to authenticating the message the authentication system verifies the second authenticated message using the private key for the authentication system to produce the message.

12. The non-transitory computer-readable storage medium of claim 9,
wherein authenticating the message involves using the private key to encrypt the message; and
wherein the target system verifies the authenticated message by using the public key to decrypt the authenticated message.

13. The non-transitory computer-readable storage medium of claim 9,
wherein authenticating the message involves using the private key to generate an authentication code for the message;
wherein sending the authenticated message to the intermediary system involves sending the message and the authentication code to the intermediary system; and
wherein the target system verifies the authenticated message by using the public key to verify that the authentication code was generated by the authentication system.

14. The non-transitory computer-readable storage medium of claim 9, wherein the intermediary system verifies that the authenticated message was received from the authentication system in response to a request by the intermediary system.

15. A system that remotely authenticates a message, comprising an authentication system configured to:
receive the message from an intermediary system, wherein the message comprises: a command that is to be executed on a target system in a plurality of target systems, an identifier for the target system, and an identifier for the intermediary system;
authenticate the intermediary system;
if the intermediary system is successfully authenticated, authenticating the message using a private key for the authentication system to produce an authenticated message; and
send the authenticated message to the intermediary system so that the intermediary system can send the authenticated message to the target system so that the target system can use a public key for the authentication system to verify the authenticated message and to execute the command, wherein the public key is known to each target system in the plurality of target systems,
wherein the target system verifies that the authenticated message was sent by an intermediary system known to the target system by determining whether the identifier for the intermediary system from the authenticated message is the same as an identity of the intermediary system that is determined by the target system.

16. A method for remotely authenticating a message, comprising:
sending the message from an intermediary system to an authentication system, wherein the message comprises: a command that is to be executed on a target system in a plurality of target systems, an identifier for the target system, and an identifier for the intermediary system;
authenticating the intermediary system with the authentication system;
if the intermediary system is authenticated, allowing the authentication system to authenticate the message using a private key for the authentication system to produce an authenticated message, wherein the authenticated message comprises the command, the identifier for the target system, and the identifier for the intermediary system;
sending the authenticated message to the intermediary system; and
sending the authenticated message from the intermediary to the target system so that the target system can use a public key for the authentication system to verify the authenticated message and to execute the command, wherein the public key is known to each target system in the plurality of target systems,
wherein the target system verifies that the authenticated message was sent by an intermediary system known to the target system by determining whether the identifier for the intermediary system from the authenticated message is the same as an identity of the intermediary system that is determined by the target system.

17. The method of claim 16, wherein prior to sending the message to the authentication system, the intermediary system generates the command to be executed on the target system.

18. The method of claim 16,
wherein prior to sending the message from the intermediary system to the authentication system, the intermediary system:
generates the command to be executed on the target system; and
authenticates the message using the public key for the authentication system to produce a second authenticated message;
wherein sending the authenticated message from the authentication system to the intermediary system involves allowing the authentication system to send the second authenticated message to the intermediary system; and
wherein prior to authenticating the message using a private key for the authentication system, the authentication system authenticates the second authenticated message using the private key for the authentication system to produce the message.

19. The method of claim 16,
wherein authenticating the message involves using the private key to encrypt the message; and
wherein the target system verifies the authenticated message by using the public key to decrypt the authenticated message.

20. The method of claim 16,
wherein authenticating the message involves using the private key to generate an authentication code for the message;
wherein sending the authenticated message to the intermediary system involves sending the message and the authentication code to the intermediary system; and
wherein the target system verifies the authenticated message by using the public key to verify that the authentication code was generated by the authentication system.

21. The method of claim 16, wherein the method further comprises verifying at the intermediary system that the authenticated message was sent from the authentication system to the intermediary system in response to a request by the intermediary system.

22. The method of claim 1, wherein the target system sends to the intermediary system at least one service tag, wherein the service tag comprises configuration information for at least one of a software component and a hardware component for the target system.

23. The method of claim 22, wherein the service tag comprises at least one of:
a version number of one or more software packages installed on the target system,
a version number of one or more hardware components for the target system,
serial numbers for one of more hardware components for the target system,
serial numbers for software components for the target system,
an operating system version number for the target system,
firmware version numbers for hardware components for the target system, and
runtime instances of software components for the target system.

* * * * *